United States Patent
Jaramillo et al.

(10) Patent No.: US 10,818,299 B2
(45) Date of Patent: *Oct. 27, 2020

(54) VERIFYING A USER USING SPEAKER VERIFICATION AND A MULTIMODAL WEB-BASED INTERFACE

(71) Applicant: Nuance Communications, Inc., Burlington, MA (US)

(72) Inventors: David Jaramillo, Lake Worth, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/275,539

(22) Filed: May 12, 2014

(65) Prior Publication Data

US 2014/0249819 A1    Sep. 4, 2014

Related U.S. Application Data

(63) Continuation of application No. 11/062,731, filed on Feb. 22, 2005, now Pat. No. 8,725,514.

(51) Int. Cl.
*G10L 17/22* (2013.01)
*H04M 3/38* (2006.01)
(Continued)

(52) U.S. Cl.
CPC .............. *G10L 17/22* (2013.01); *G06F 21/32* (2013.01); *G10L 17/00* (2013.01); *H04M 3/385* (2013.01); *H04M 2201/41* (2013.01)

(58) Field of Classification Search
CPC ........... H04M 3/4938; H04M 2201/41; H04M 2201/42; H04M 7/006; H04M 3/385;
(Continued)

(56) References Cited

U.S. PATENT DOCUMENTS 5,897,616 A    4/1999 Kanevsky et al.
5,915,001 A    6/1999 Uppaluru
(Continued)

FOREIGN PATENT DOCUMENTS

EP      1 255 194 A2      11/2002
WO      WO 99/54868 A1    10/1999
(Continued)

OTHER PUBLICATIONS

Official Action from European Patent Application No. 06707758.6 dated Dec. 7, 2010.
(Continued)

*Primary Examiner* — Angela A Armstrong
(74) *Attorney, Agent, or Firm* — Wolf, Greenfield & Sack, P.C.

(57) ABSTRACT

A method of verifying a user identity using a Web-based multimodal interface can include sending, to a remote computing device, a multimodal markup language document that, when rendered by the remote computing device, queries a user for a user identifier and causes audio of the user's voice to be sent to a multimodal, Web-based application. The user identifier and the audio can be received at about a same time from the client device. The audio can be compared with a voice print associated with the user identifier. The user at the remote computing device can be selectively granted access to the system according to a result obtained from the comparing step.

18 Claims, 3 Drawing Sheets

(51) Int. Cl.
*G06F 21/32* (2013.01)
*G10L 17/00* (2013.01)

(58) Field of Classification Search
CPC ....... G10L 17/00; G10L 15/063; G10L 15/22; G10L 15/30; G10L 17/22; G06F 21/32; G06Q 20/40145; H04L 9/3226; H04L 9/3231
See application file for complete search history.

(56) References Cited

U.S. PATENT DOCUMENTS

| | | | |
|---|---|---|---|
| 6,073,101 A | 6/2000 | Maes | |
| 6,107,935 A | 8/2000 | Comerford et al. | |
| 6,219,639 B1 | 4/2001 | Bakis et al. | |
| 6,266,640 B1 | 7/2001 | Fromm | |
| 6,529,871 B1 | 3/2003 | Kanevsky et al. | |
| 6,691,089 B1 * | 2/2004 | Su | G06F 21/32 704/244 |
| 6,754,628 B1 | 6/2004 | Chaudhari et al. | |
| 6,801,604 B2 | 10/2004 | Maes et al. | |
| 7,406,657 B1 * | 7/2008 | Callaghan | G06Q 10/10 715/225 |
| 7,805,310 B2 * | 9/2010 | Rohwer | G10L 15/30 704/270.1 |
| 8,725,514 B2 * | 5/2014 | Jaramillo | G06F 21/32 704/270.1 |
| 2002/0169608 A1 | 11/2002 | Tamir et al. | |
| 2003/0088421 A1 * | 5/2003 | Maes | G10L 15/30 704/270.1 |
| 2003/0163739 A1 | 8/2003 | Armington et al. | |
| 2004/0006474 A1 * | 1/2004 | Gong | H04M 3/4931 704/270.1 |
| 2004/0177097 A1 | 9/2004 | Yu et al. | |
| 2004/0186724 A1 | 9/2004 | Morin | |
| 2006/0101146 A1 | 5/2006 | Wang | |

FOREIGN PATENT DOCUMENTS

| | | | |
|---|---|---|---|
| WO | WO 01/82190 A1 | | 11/2001 |
| WO | WO 02069325 | * | 9/2002 |

OTHER PUBLICATIONS

Bellegarda, et al. "Language-Independent, Short-Enrollment Voice Verification Over a far-field Micorphone". Spoken Language Group, Apple Computer, Inc., Cupertino, CA, 2001.

Broun, et al. "Multimodal fusion of polynomial classifiers for automatic person recognition". Proceedings of the SPIE—The Int'l Society for Optical Engineering, vol. 4390, pp. 166-174.

Chou et al. EMMA: Extensible MultiModal Annotation markup language. W3C Working Draft, Dec. 14, 2004.

Chou, W. et al. "EMMA: Extensible MultiModal Annotation markup language" W3C Working Draft, Sep. 1, 2004.

Dahl, D. "Technical Standards Facilitate Innovation" Speech Technology, Jul. 8, 2004.

Georgescu, S. "Multimodal Access Enabler Based on Adaptive Keyword Spotting" M. Freire et al. (Eds.): ECUMN 2004, LNCS 3262, pp. 349-357, 2004.

Lee, et al. "A Method on Improving and Enrolling Speed for the MLP-Based Speaker Verification System through reducing Learning Data". PRICAI 2002: Trends in Artificial Intelligence. 7th Pacific Rim Int'l Conf. on Artifical Intelligence. Proceedings(Lecture Notes in Artificual Intelligence) vol. 2417, pp. 619, Published: Berlin, Germany, 2002.

Xiang, et al. "Efficient Text-Independent Speaker Verification with Structural Gaussian Mixture Models and Neural Network". IEEE Transactions on Speech and Audio Processing, vol. 11, No. 5, Sep. 2003.

Zhang, et al. "Automatic Speechreading with Applications to Human-computer Interfaces". Eurasip Jnl on Applied Signal Processing, vol. 2002, No. 11, Nov. 2002.

EP 06707758.6, Dec. 7, 2010, Official Action.

* cited by examiner

VERIFYING A USER USING SPEAKER VERIFICATION AND A MULTIMODAL WEB-BASED INTERFACE

RELATED APPLICATIONS

This application claims the benefit under 35 U.S.C. § 120 and is a continuation of U.S. patent application Ser. No. 11/062,731, filed Feb. 22, 2005, and entitled VERIFYING A USER USING SPEAKER VERIFICATION AND A MULTIMODAL WEB-BASED INTERFACE, which is incorporated herein by reference in its entirety.

BACKGROUND

Field of the Invention

The present invention relates to verifying a user identity using a multimodal Web-based interface.

Description of the Related Art

A multimodal interface allows a user to communicate with an application or other system through visual and verbal means. For example, a user can communicate through a graphical user interface (GUI), by issuing one or more spoken utterances, or by providing a combination of GUI input and voice input. Multimodal interactions can provide users with a more intuitive means for communicating with a system.

With respect to portable computing devices such as smart phones, personal digital assistants, and other devices having small form factors, multimodal interfaces allow users to select a means of interaction based upon circumstance. In some cases, it may be beneficial to utilize a GUI, while voice data input may be more advantageous or convenient in other cases. Under normal circumstances, for example, a user may opt for voice interaction because it is intuitive and fast. Voice data input further relieves the user from having to utilize a miniature keypad or small GUI, either of which can be cumbersome and tedious to use.

In noisy environments, however, voice data input may not be possible. Surrounding noise levels may mask the user voice inputs to such an extent that accurate recognition of the user's speech is not possible. In other circumstances, such as when verifying a user's identity, the user may opt for keypad entry or nonverbal interaction as well. Typically, user verification is performed using a username and a password. Because speaking such information into a multimodal interface can allow others to overhear confidential information, users often enter such information using GUIs or keypads. As noted, however, entering such information in this manner on a portable computing device can be cumbersome and tedious.

There are other disadvantages to using passwords. Typically, passwords are difficult to remember and are not very secure. Remembering passwords can be particularly difficult in light of the plethora of accounts held by users—each requiring a username and password. To avoid having to remember each password, users tend to use a common password for multiple accounts, write down passwords on the back of an access card, i.e. ATM card, or use a password that is the same as the user's username for the account. Any one of these behaviors can place the security of a user account in jeopardy.

Still, as functions such as banking, airline reservations, product purchasing, and the like, begin to migrate to multimodal Web-based interfaces, user verification will become increasingly important. Such systems can be successful only if the transactions are secure and if the systems ensure that the user is who the user claims to be. Accordingly, it would be beneficial to provide a technique for verifying users through a multimodal interface which overcomes the deficiencies described above.

SUMMARY OF THE INVENTION

The present invention provides a solution for verifying a user's identity over a communication network. One embodiment of the present invention can include a method of verifying a user identity using a multimodal Web-based interface. The method can include sending, to a remote computing device, a multimodal markup language document that, when rendered by the remote computing device, queries a user for a user identifier and causes audio of the user's voice to be sent to a multimodal, Web-based application. The user identifier and the recording can be received at about a same time from the client device. The audio can be compared with a voice print associated with the user identifier. Accordingly, the user at the remote computing device can be selectively granted access to an online system according to a result obtained from the comparing step.

Another embodiment of the present invention can include a system for verifying a user's identity. The system can include a verification system having a voice print database including a plurality of voice prints, each being associated with a user identifier. The system also can include a multimodal application configured to send a multimodal markup language document to a client device. The multimodal markup language document can specify a random script and, upon execution, cause a user identifier and audio, comprising a digital representation of a speaker reading the random script aloud to be sent back to the multimodal application. The multimodal application can submit the script, the recording, and the user identifier to the verification system for verifying the identity of the speaker by comparing the recording with a voice print selected from the plurality of voice prints that is associated with the user identifier.

Other embodiments of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for verifying a user identity through the use of a multimodal Web-based interface. In accordance with the present invention, the identity of a user can be verified through the use of voice identification technology. A user can be presented with a multimodal document received from a multimodal Web-based application. The multimodal document, i.e. a Web page type of interface, can request that the user provide a user identifier or username (hereafter "user ID") and a voice sample. Both the user ID and voice sample can be provided back to the multimodal Web-based application. Voice verification can be performed upon the voice sample with reference to the user ID. Based upon the results of the voice verification, the user can be granted access to an online system or be denied entry.

Figure 1:
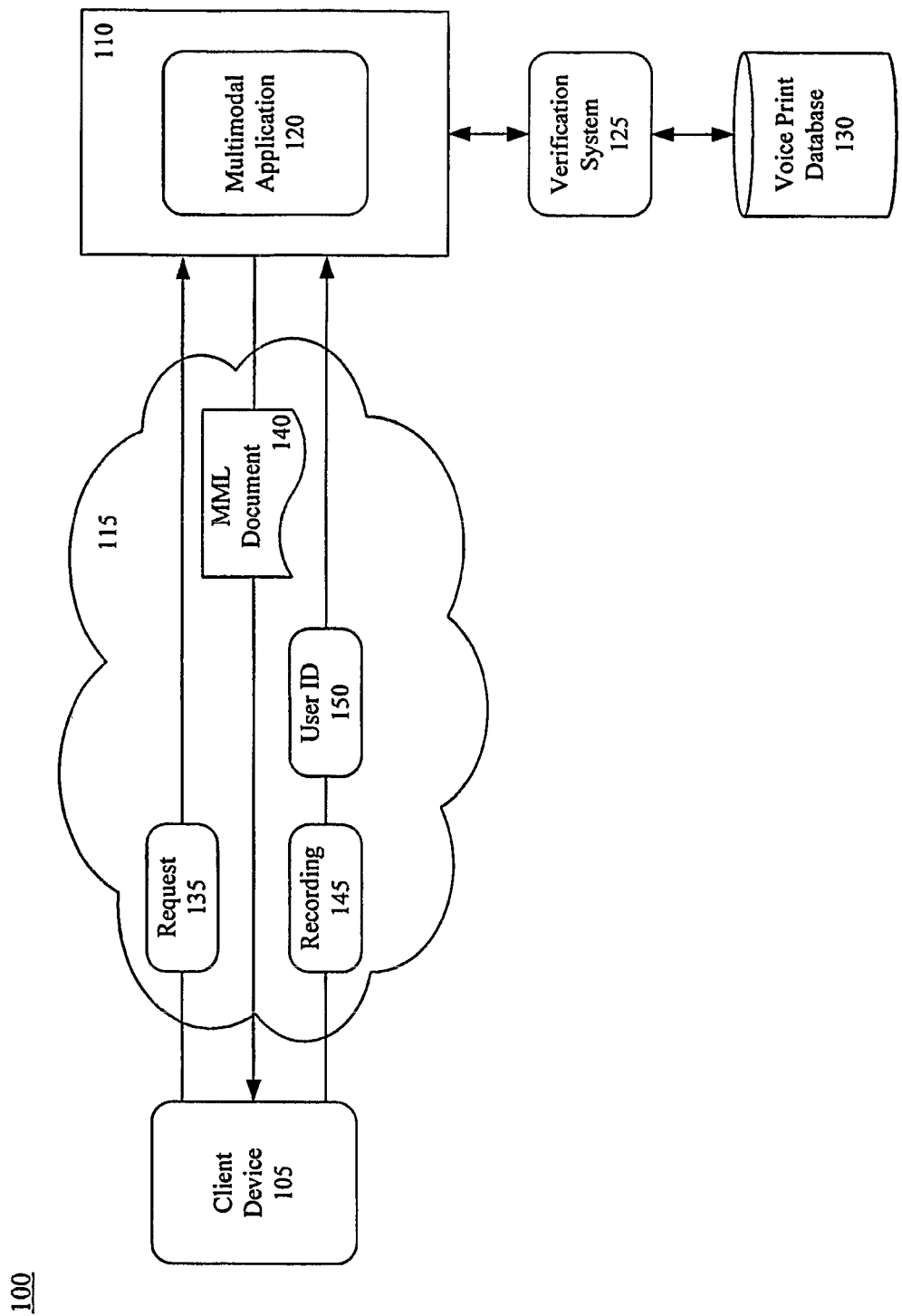
FIG. 1 is a schematic diagram illustrating a system for performing user verification using a multimodal Web-based interface in accordance with the inventive arrangements disclosed herein.

FIG. 1 is a schematic diagram illustrating a system 100 for performing user verification using a multimodal Web-based interface in accordance with the inventive arrangements disclosed herein. As shown, the system 100 can include a client device 105, a server 110 including a multimodal application 120, and a verification system 125 having a voice print database 130.

In one embodiment, the client device 105 can be any of a variety of computing devices such as a desktop computer, a server, or the like. In another embodiment, the computing device 105 can be a portable and/or mobile computing device such as a laptop computer, a personal digital assistant (PDA) configured for Internet communications, whether wired or wireless, a mobile phone, or the like. In any case, the client device 105 can include suitable software for sending requests to, and receiving information from the server 110. For example, the client device 105 can include a suitable browser capable of rendering markup language documents, including multimodal markup language (MML) documents.

An MML document can specify visual and voice components for user interaction. Accordingly, an MML document can include any markup language based document, or file, that when rendered, allows a user to provide input through visual means such as a graphical user interface (GUI) and through audible means by speaking or providing dual tone multi-frequency inputs. One example of such a markup language is the X+V markup language. X+V is a proposed markup language for developing multimodal Web pages that combines Extensible Hypertext Markup Language (XHTML) and a subset of Voice Extensible Markup Language (VoiceXML).

XHTML, in general, is a version of HTML 4.0 that has been adjusted to comply with the rules of Extensible Markup Language (XML). VoiceXML is an XML-based language developed through the World Wide Web Consortium (W3C). VoiceXML provides a standardized format for building speech-based applications. Together, XHTML and VoiceXML (X+V) enable Web developers to add voice input and output to traditional, graphically-based Web pages.

Another example of MML is based on adding Speech Application Language Tags (SALT) to a host markup language such as XHTML, Hypertext Markup Language (HTML), or Scalable Vector Graphics (SVG). SALT is a proposed markup language that can be used to develop multimodal Web pages that support both visual and speech modes of user interaction. SALT is an XML-based language developed through the SALT Forum.

The server 110 can be any of a variety of information processing systems capable of fielding requests and serving information over a communications network, for example a Web server. As shown, the server 110 and the client device 105 can communicate over a communications network 115 such as the Internet, a local area network (LAN), a wide area network (WAN), a mobile or cellular network, another variety of communication network, or any combination thereof.

The multimodal application 120 can execute within the server 110. Accordingly, the multimodal application 120 can receive requests and information from the client device 105 and provide information, such as markup language documents, whether multimodal or not, in return. Though not shown, the multimodal application 120 can include, or access, audio processing services such as text-to-speech (TTS), speech recognition, and/or dual tone multi-frequency processing. These services can be located within the server 110 or can be located in a different computing system that is communicatively linked with the multimodal application 120.

The verification system 125 can verify user identities by comparing recordings of a user's voice with voice prints stored in the voice print database 130. The voice print database 130 can include a plurality of different voice prints from users that have enrolled in the verification system 125. Each voice print can correspond to, or be associated with, a user ID. When a voice recording is received, the verification system 125 can compare the voice recording with the voice prints in the voice print database 130 to determine whether a match exists.

In operation, the client device 105 can send a request 135 to the multimodal application 120 requesting an MML document. The multimodal application 120 can respond by sending MML document 140, i.e. a multimodal Web page. Upon rendering the MML document 140, the client device 105, under the direction of the MML document, can request a user ID and voice sample from the user. In one embodiment, the document can provide a script to be read by the user when providing the voice sample. Notably, any prompts can be audio prompts, whether recorded audio or TTS, or textual prompts displayed on a display screen of the client device 105.

The client device 105 can make a digital recording of the user's voice, for example as the user reads the script aloud. Once the user ID and a recording of the user's voice have been obtained by the client device 105, the client device 105 can send both to the multimodal application 120 under the direction of the MML document 140. The recording 145 and the user ID 150 can be sent at approximately the same time. Upon receiving the user ID 150 and recording 145, the multimodal application 120 can provide both to the verification system 125 for processing. The verification system 125 can locate a voice print in the voice print database 130 using the provided user ID 150. The verification system 125 then can compare the voice print with the recording 150 to determine whether the recording 150 matches the voice print. If so, the user can be granted access to an online system such as a Web site for banking, reservations, or the like. If not, access can be denied.

In another embodiment, audio need not be recorded in the client device 105, but rather streamed from the client device 105 over a data connection to the multimodal application 120. Mobile devices such as cell phones that support voice over data channel, known as Voice over IP (VoIP), can support the streaming of audio. In cases where the audio is streamed from the client device 105, the audio can be recorded by the multimodal application 120.

Figure 2:
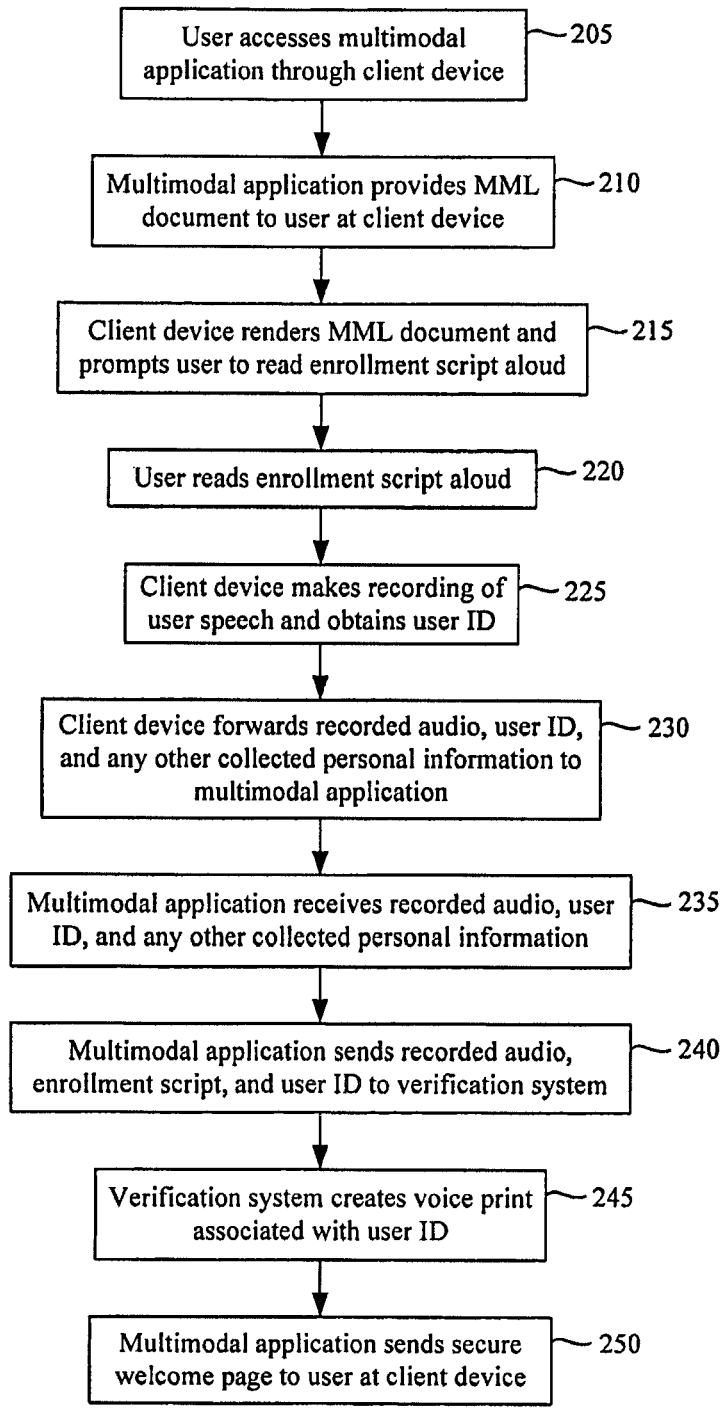
FIG. 2 is a flow chart illustrating a method of enrolling a user for purposes of user verification in accordance with the inventive arrangements disclosed herein.

FIG. 2 is a flow chart illustrating a method 200 for enrolling a user for purposes of user verification in accordance with the inventive arrangements disclosed herein. The method 200 can be performed by the system described with reference to FIG. 1, or another suitable system. The method 200 can begin in step 205, where a user that is new to an online system, can access a multimodal Web-based application. The user can access the multimodal Web-based application through a client device.

In step 210, the multimodal Web-based application can provide a secure MML document to the user at the client device. As noted, the MML document can specify a Web-based multimodal interface, or Web page. As such, it can specify fields for receiving a user ID as well as other personal information that may be necessary such as telephone numbers, addresses, electronic mail addresses, and the like. The MML document further can specify an enrollment script. The enrollment script can include text, numbers, symbols, letters, and the like.

In step 215, upon rendering the MML document, the client device can prompt the user to read the enrollment script aloud. The prompting can be text based, i.e. written instructions in the Web page, or can be an audible prompt, whether TTS or prerecorded audio. The enrollment script can be displayed as text upon the display screen of the client device. In step 220, the user can read the enrollment script aloud, i.e. speak the enrollment script. In step 225, the client device records the user reading the enrollment script aloud and obtains the user ID and any other personal information provided by the user. According to one embodiment of the present invention, a recording instruction within the MML document can instruct the client device to make a digital recording of the user speech. For example, within an MML document written in X+V, the record tag can be used.

In step 230, when the user has finished reading the enrollment script aloud, the client device can forward the recorded audio to the multimodal application executing on the server. In addition to the recorded audio, any information entered into the fields of the MML document, particularly the user ID, can be sent to the multimodal, Web-based application. It should be appreciated that the data obtained from the fields of the MML document and the recorded audio can be sent at the same time, or at approximately the same time. The client device forwards such information as specified by the MML document when executed.

As noted, in another embodiment, enrollment and/or verification audio can be streamed from the client device to the multimodal, Web-based application. In such an embodiment, the audio can be recorded by the multimodal, Web-based application. In that case, a streaming instruction within the MML document can instruct the client device to stream audio of the user speech to the multimodal, Web-based application.

In step 235, the multimodal, Web-based application can receive the audio as well as any other information entered into the MML document at the client device such as the user ID. In step 240, the multimodal, Web-based application sends the user ID, the audio, and the enrollment script to the verification system. In step 245, the verification system can create a unique voice print for the user from the audio and the text of the enrollment script. The resulting voice print can be associated with the user ID and stored within the voice print database. After successful enrollment of the user, in step 250, the multimodal, Web-based application can send a secure welcome page to the user and allow the user to access other secure pages within the server or another server.

Figure 3:
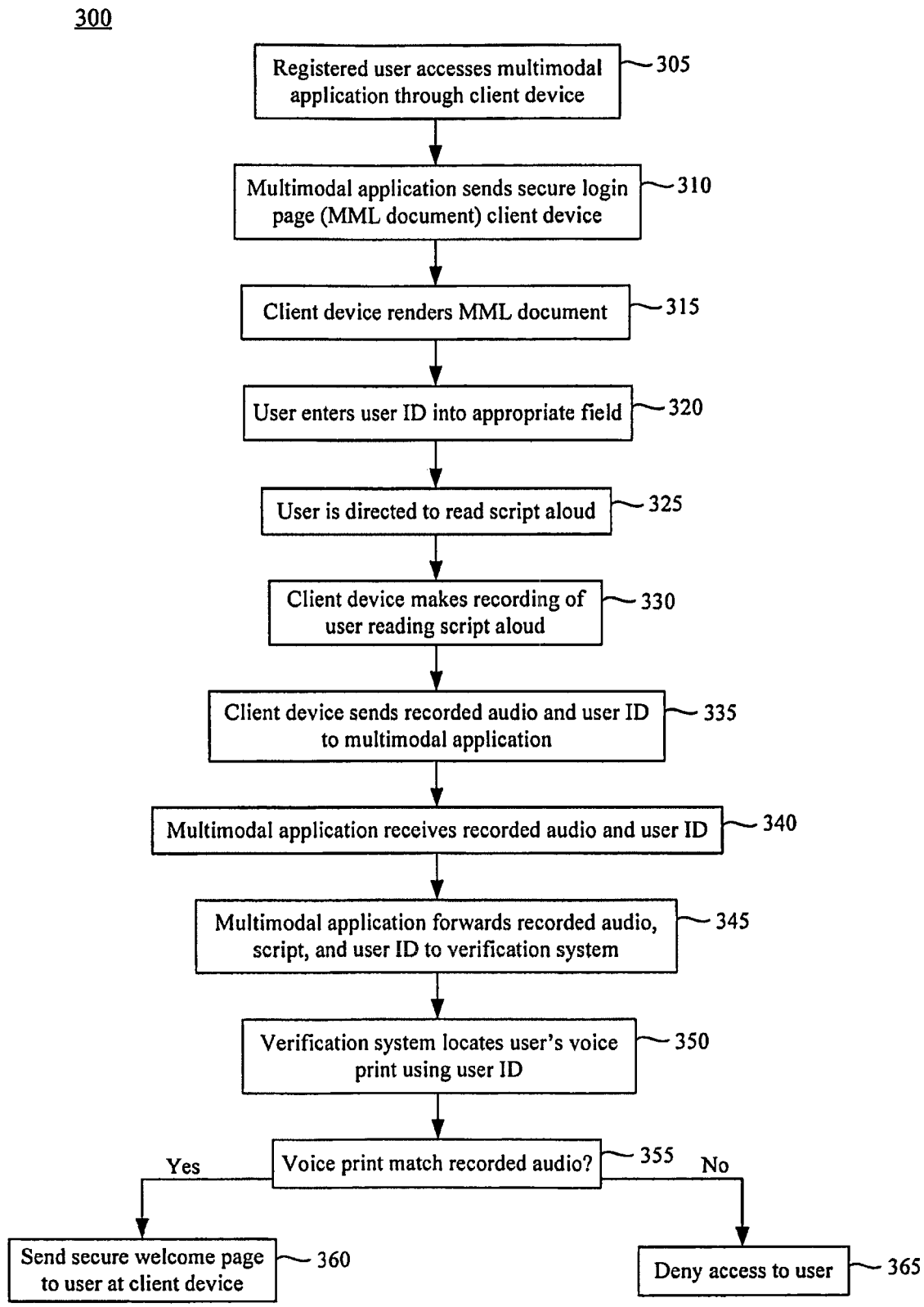
FIG. 3 is a flow chart illustrating a method of performing user verification in accordance with the inventive arrangements disclosed herein.

FIG. 3 is a flow chart illustrating a method 300 for performing user verification in accordance with the inventive arrangements disclosed herein. The method 300 can be performed using the system described with reference to FIG. 1 or another comparable system. In step 305, a registered user can access the multimodal, Web-based application via a client device to request a Web page or otherwise login to a system. In step 310, the multimodal application can send an MML document, in this case a secure Web-based login page, which can be rendered in step 315 by the client device.

The secure login page can specify one or more fields for receiving user input such as a user ID. The secure login page further can specify a script. The script can be a random sequence of letters, numbers, and/or words. The script can be randomly generated by the multimodal, Web-based application, for example by selecting words, letters, and/or numbers from a collection of such text. In one embodiment, the script can include any words, letters, or numbers randomly selected from the enrollment script.

The randomly generated script prevents imposters from trying to defraud the verification system. If an imposter attempts to play pre-recorded portions of a registered user's speech, the pre-recorded speech will not match the expected user speech to be used in voice print comparison. The prerecorded user speech will include different words than were specified in the randomly generated script. Accordingly, user verification will fail. Thus, according to one embodiment of the present invention, speech recognition can be used in addition to voice verification to prevent imposters from using prerecorded user speech to defraud the system.

In step 320, the user can enter his or her user ID into the appropriate field of the MML document now rendered on the display of the client device. The user can enter the user ID using speech, keypad entries, stylus entries, or the like. The particular manner in which the user enters the user ID is not intended to limit the present invention. In any case, the user ID can be stored in the client device temporarily.

In step 325, the user can be directed to read aloud the script presented upon the display of the client device. The user can be prompted through a TTS prompt, an audio prompt, or by textual instructions displayed in the rendered MML document. In step 330, the client device can make a digital recording of the user reading the script aloud. In one embodiment, the digital recording can be stored as PCM data. It should be appreciated, however, that the particular formatting of the digital audio file is not intended to limit the present invention as any of a variety of different digital audio formats can be used, such as ADPCM, MP3, AAC, or compressed DSR as may be used in the case where audio is streamed over a data connection to the multimodal, Web-based application.

In step 335, when the user is finished speaking, the client device can send the script and the user ID to the multimodal, Web-based application. The user ID and audio, i.e. verification audio, can be submitted from the client at approximately the same time and received by the multimodal, Web-based application at approximately the same time, whether as an entire recording or as streamed audio. In step 340, the multimodal, Web-based application can receive the audio and the user ID. In step 345, the multimodal, Web-based application can forward the audio, script, and user ID to the verification system.

In step 350, the verification system locates or retrieves the user's voice print from the voice print database using the user ID as a reference. In step 355, the verification system can compare the audio with the voice print matching the user ID to determine whether the audio matches the voice print. If so, the method can proceed to step 360 where a secure welcome page, which can be a conventional visual Web page or a multimodal Web page, can be provided from the multimodal, Web-based application to the user at the user device. The user, having been verified, can be allowed access to the site and other secure Web pages. If the recorded audio does not match the voice print, the user is denied access by the multimodal, Web-based application in step 365.

The present invention provides a solution for verifying the identity of a user using a Web-based multimodal interface. In accordance with the present invention, a speaker verification system verifies the identity of the speaker based on the physical characteristics of the speaker's voice. Through the multimodal interface, the user can both register and later be verified by the verification system. Enrollment is facilitated in that the enrollment script is presented to the user as visual text so the user need not have to remember a long passage of text.

The speaker verification portion requires the user to speak a random script, as provided by the multimodal application. The random script prevents imposters from trying to play pre-recorded portions of another user speaking in an attempt to defraud the verification system. The pre-recorded speech will not match the expected user speech as specified by the randomly generated script. The script used to verify the identity of a user, similar to the enrollment script, also can be presented visually. Verification using a multimodal interface can be more secure than using only one modality as both a visual password and speech verification can be required at the same time.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which, when loaded in a computer system, is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for user authentication, the method comprising acts of:
   receiving from a user a request for access to content;
   prior to accessing stored information associated with any of one or more users having access to the content for which access is requested:
      accessing a second utterance that users are prompted to speak during an enrollment process; and
      randomly selecting at least one portion of the second utterance as a first utterance with which to prompt the user;
   in response to the request, sending, via a single data communication network connection to a remote computing device, information for use in authenticating the user, the information comprising a single page including both an input field for receiving a user identifier and a first prompt to be rendered to the user to prompt the user to provide a voice sample, wherein the first prompt to be rendered to the user prompts the user to speak the first utterance;
   receiving, via the single data communication network connection, from the remote computing device, as a result of the remote computing device executing the single page including both the input field and the first prompt to be rendered to the user, a user identifier entered by the user into the input field and audio data representing speech spoken by the user in response to the first prompt; and
   in response to receiving the user identifier and the audio data:
      accessing a voice print associated with the received user identifier;
      analyzing the received audio data to determine whether the received audio data matches the accessed voice print; and
      selectively granting to the user access to the content based on whether the received audio data matches the accessed voice print.

2. The method of claim 1, wherein the method further comprises an act of, during the enrollment process, sending to the user a second prompt to prompt the user to speak the second utterance.

3. The method of claim 2, wherein the audio data is first audio data, and wherein the method further comprises acts of:
   using second audio data to generate the voice print, the second audio data being provided by the user in response to the second prompt; and
   storing the voice print in association with the user identifier.

4. The method of claim 1, wherein the first prompt comprises a textual prompt instructing the user to read a displayed script.

5. The method of claim 1, wherein the first prompt comprises a speech prompt instructing the user to speak the first utterance.

6. The method of claim 1, wherein the page comprises a multimodal markup language document to be rendered by the remote computing device to prompt the user to enter a user identifier into the first field and to provide a voice sample.

7. At least one computer-readable storage device having stored thereon instructions that, when executed by at least one processor, perform a method for user authentication, the method comprising acts of:
   receiving from a user a request for access to content;
   prior to accessing stored information associated with any of one or more users having access to the content for which access is requested:
      accessing a second utterance that users are prompted to speak during an enrollment process; and
      randomly selecting at least one portion of the second utterance as a first utterance with which to prompt the user;
   in response to the request, sending, via a single data communication network connection to a remote computing device, information for use in authenticating the user, the information comprising a single page including both an input field for receiving a user identifier and a first prompt to be rendered to the user to prompt the user to provide a voice sample, wherein the first prompt to be rendered to the user prompts the user to speak the first utterance;

receiving, via the single data communication network connection, from the remote computing device, as a result of the remote computing device processing the single page including both the input field and the first prompt to be rendered to the user, a user identifier entered by the user into the input field and audio data representing speech spoken by the user in response to the first prompt; and in response to receiving the user identifier and the audio data:
    accessing a voice print associated with the received user identifier;
    analyzing the received audio data to determine whether the received audio data matches the accessed voice print; and
    selectively granting to the user access to the content based on whether the received audio data matches the accessed voice print.

8. The at least one computer-readable storage device of claim 7, wherein the method further comprises an act of, during the enrollment process, sending to the user a second prompt to prompt the user to speak the second utterance.

9. The at least one computer-readable storage device of claim 8, wherein the audio data is first audio data, and wherein the method further comprises acts of:
    using second audio data to generate the voice print, the second audio data being provided by the user in response to the second prompt; and
    storing the voice print in association with the user identifier.

10. The at least one computer-readable storage device of claim 8, wherein the page comprises a multimodal markup language document to be rendered by the remote computing device to prompt the user to enter a user identifier into the first field and to provide a voice sample.

11. The at least one computer-readable storage device of claim 7, wherein the first prompt comprises a textual prompt instructing the user to read a displayed script.

12. The at least one computer-readable storage device of claim 7, wherein the first prompt comprises a speech prompt instructing the user to speak the first utterance.

13. A system comprising at least one processor programmed to perform a method for user authentication, the at least one processor programmed to:
    receive from a user a request for access to content;
    prior to accessing stored information associated with any of one or more users having access to the content for which access is requested:
        access a second utterance that users are prompted to speak during an enrollment process; and
        randomly select at least one portion of the second utterance as a first utterance with which to prompt the user;
    in response to the request, send, via a single data communication network connection to a remote computing device, information for use in authenticating the user, the information comprising a single markup language document including both an input field for receiving a user identifier and a first prompt to be rendered to the user to prompt the user to provide a voice sample, wherein the first prompt to be rendered to the user prompts the user to speak the first utterance;
    receive, via the single data communication network connection, from the remote computing device, as a result of the remote computing device rendering the single markup language document including both the input field and the first prompt, a user identifier entered by the user into the input field and audio data representing speech spoken by the user in response to the first prompt; and
    in response to receiving the user identifier and the audio data:
        access a voice print associated with the received user identifier;
        analyze the received audio data to determine whether the received audio data matches the accessed voice print; and
        selectively grant to the user access to the content based on whether the received audio data matches the accessed voice print.

14. The system of claim 13, wherein the at least one processor is further programmed to, during the enrollment process, send to the user a second prompt to prompt the user to speak the second utterance.

15. The system of claim 14, wherein the audio data is first audio data, and wherein the at least one processor is further programmed to:
    use second audio data to generate the voice print, the second audio data being provided by the user in response to the second prompt; and
    store the voice print in association with the user identifier.

16. The system of claim 13, wherein the first prompt comprises a textual prompt instructing the user to read a displayed script.

17. The system of claim 13, wherein the first prompt comprises a speech prompt instructing the user to speak the first utterance.

18. The system of claim 13, wherein the page comprises a multimodal markup language document to be rendered by the remote computing device to prompt the user to enter a user identifier into the first field and to provide a voice sample.

* * * * *